(12) United States Patent
Caine

(10) Patent No.: US 7,340,418 B2
(45) Date of Patent: Mar. 4, 2008

(54) VISUAL DATABASE FOR LINKING GEOGRAPHY TO SEISMIC DATA

(75) Inventor: Bobby J. Caine, Houston, TX (US)

(73) Assignee: ConocoPhillips Company

( * ) Notice: Subject to any disclaimer, the term of this patent is extended or adjusted under 35 U.S.C. 154(b) by 5 days.

(21) Appl. No.: 11/544,106

(22) Filed: Oct. 6, 2006

(65) Prior Publication Data

US 2007/0067226 A1   Mar. 22, 2007

Related U.S. Application Data

(62) Division of application No. 09/893,070, filed on Jun. 27, 2001, now abandoned.

(51) Int. Cl.
G06Q 30/00 (2006.01)
G06F 17/30 (2006.01)

(52) U.S. Cl. ............... 705/26; 705/27; 702/5; 702/10; 702/11

(58) Field of Classification Search ........ 705/26, 705/27; 702/11
See application file for complete search history.

(56) References Cited

U.S. PATENT DOCUMENTS

| | | | |
|---|---|---|---|
| 4,558,438 A | 12/1985 | Jones et al. | 367/71 |
| 4,870,576 A | 9/1989 | Tornetta | 364/401 |
| 4,972,319 A | 11/1990 | Delorme | 364/419 |
| 5,032,989 A | 7/1991 | Tornetta | 364/401 |
| 5,502,576 A | 3/1996 | Ramsay et al. | 358/444 |
| 5,574,917 A | 11/1996 | Good et al. | 395/561 |
| 5,754,704 A | 5/1998 | Barnsley et al. | 382/249 |
| 5,841,473 A * | 11/1998 | Chui et al. | 348/390.1 |
| 5,940,777 A | 8/1999 | Keskes | 702/16 |
| 5,987,125 A | 11/1999 | Stringer et al. | 380/4 |
| 5,999,882 A | 12/1999 | Simpson et al. | 702/3 |
| 6,023,655 A | 2/2000 | Nomura | 701/208 |
| 6,070,125 A | 5/2000 | Murphy et al. | 702/11 |
| 6,151,555 A | 11/2000 | Van Bemmel et al. | 702/14 |
| 6,415,291 B2 * | 7/2002 | Bouve et al. | 707/10 |
| 6,751,553 B2 * | 6/2004 | Young et al. | 702/5 |
| 2002/0005866 A1 * | 1/2002 | Gorham et al. | 345/760 |
| 2002/0188500 A1 * | 12/2002 | Kwok et al. | 705/10 |

OTHER PUBLICATIONS

Author unknown, "Landmark Delivers Information Management for Every E&P Desktop," PR Newswire, New York, Sep. 15, 1998, p. 1.*

(Continued)

Primary Examiner—Yogesh C. Garg
Assistant Examiner—Amee A. Shah
(74) Attorney, Agent, or Firm—Madan Mossman & Sriram P.C.

(57) ABSTRACT

A medium having a plurality of computer readable files relating to geophysical seismic data recorded thereon. The files include a map display having multiple levels of geographic detail and including a plurality of surface seismic data lines. A plurality of compressed seismic data files is also included, each file producing a corresponding geophysical display when its corresponding surface seismic data line is selected. The files also include a plurality of references to a plurality of full seismic data files. Each of the compressed seismic data files has less information content than its corresponding full seismic data file.

6 Claims, 6 Drawing Sheets

OTHER PUBLICATIONS

Author unknown, "Petroweb Names Dave Noel President And CEO; Chairman Darcy Vaughan Directed Strategic Business Development New Senior Management Team Will Propel Growth," PR Newswire, Sep. 13, 2000.*

Author unknown, "Free Large Format Maps," The Oil and Gas Journal, Nov. 16, 1998, p. 89.* www.stickmap.com, dated Feb. 29, 2000, captured via WaybackMachine, available at www.archive.org.*

* cited by examiner

| NAME | SIZE | TYPE |
|---|---|---|
| Index.htm | 1KB | Micro... |
| logo.gif | 8KB | GIF I... |
| ⋮ | | |
| USA-Map.htm | 1KB | Micro... |
| usa-color.jpg | 53KB | JPEG... |
| ⋮ | | |
| OK.htm | 8KB | Micro... |
| Okquads_A.jpg | 1,133KB | JPEG... |
| ⋮ | | |
| tangier.htm | 1KB | Micro... |
| tangier.jpg | 247KB | JPEG... |
| ⋮ | | |
| 239.jpg | 402KB | JPEG... |
| 240.jpg | 394KB | JPEG... |

|  | 99°45'N | | | | 99°40'N | | | | | 99°35'N | | | 340 | 99°30'N | |
|---|---|---|---|---|---|---|---|---|---|---|---|---|---|---|---|
|  | | | | | 1500000.0 | | | | 1520000.0 | | | | 1540000.0 | 1550000.0 | |
| 36°30'N | 3 | 2 | 1 | 6 | 5 | 4 | 3 | 2 | 1 | 6 | 5 | 4 | 3 | 2 G-89 1 | 36°30'N |
|  | 10 | 11 | 12 | 7 | 8 | 9 | 10 | 11 | 12 | 7 | 8 | 9 | 10 | 11 | 12 |
| 540000.0 | 15 | 14 | 13 | 18+ | 17 | 16 | 15 | 14 | 13 | 18 | 17 | 16 | 15 | 14 | 13 | 540000.0 |
|  | | | | | | 23N 23W | | | | | G-92-23N 22W | | | | | 0-92 |
| 300 | 22 | 23 | 24 | 19 | 20 | 21 | 22 | 23 | 24 | 19 | 20 | 21 | 22 | 23 | 24 |
|  | 27 | 26 | 25 | 30 | 29 | 28 | 27 | 26 | 25 | 30 | 29 | 28 | 27 | 26 | 25 |
|  | 34 | 35 | 36 | 31 | 32 | 33 | 34 | 35 | 36 | 31 | 32 | 33 | 34 | 35 | 36 |
| 36°25'N 520000.0 | 3 | 2 | 1 | 6 | 5 | 4 | 3 | 2 | 1 | 6 | 5 | 4 | 3 | 2 | 1 | 520000.0 36°25'N |
|  | 10 | 11 | 12 | 7 | 8 | 9 | 10 | 11 | 12 | 7 | 8 | 9 | 10 | 11 | 12 |
| 310 | 15 | 14 | 13 | 18 | 17 | 16 | 15 | 14 | 13 | 18 G-90 | 17 | 16 | 15 | 14 | 13 | 0-90 |
|  | | | | | | 22N 23W | | | | | 22N 23W | | | | | |
|  | 2 | 23 | 24 | 19 | 20 | 21 | 22 | 23 | 24 | 19 | 20 | 21 | 22 | 23 | 24 |
| 500000.0 | 7 | 26 | 25 | 30 | 29 | 28 | 27 | 26 | 25 | 30 | 29 | 28 O-3-85 | 27 | 26 | 25 | 3 | 500000.0 |
|  | | | | | | | | | | | | | | O-361 | 0-261 |
|  | 4 | 35 | 36 | 31 | 32 | 33 | 34 | 35 | 36 | 31 | 32 | 33 | 34 | 35 G-92 | 36 | 3 |
| 36°20'N | 3 | 2 | 1 | 6 | 5 | 4 | 3 | 2 | 1 | 6 | 5 | 4 | 3 | 2 | 1 | 36°20'N |
|  | 0 | 11 | 12 | 7 | 8 | 9 | 10 | 11 | 12 | 7 | 8 | 9 | 10 | 11 | 12 |
| 480000.0 | 5 | 14 | 13 | 18 | 17 | 16 | 15 | 14 | 13 | 18 | 17 | 16 | 15 | 14 | 13 | 480000.0 |
|  | | | | | | 21N 23W | | O-4-85 | | | 21N 22W | | | | | G-4-85 |
| 320 | 2 | 23 | 24 | 19 | 20 | 21 | 22 | 23 | 24 | 19 | 20 | 21 | 22 | 23 | 24 | 19 |
|  | 7 | 26 | 25 | 30 | 29 | 28 | 27 | 26 | 25 | 30 | 29 | 28 | 27 | 26 | 25 | 30 |
|  | TANGIER | | | | | | | | | | | | | | | A |
| 460000.0 36°15'N | | 35 | 36 | 31 | 32 | 33 | 34 | 35 | 36 | 31 | 32 | 33 | 34 | 35 | 36 | 32 | 460000.0 36°15'N |
|  | | | 1500000.0 | | | 1520000.0 | | | | 1540000.0 | | | | 1550000.0 | |
|  | 99°45'N | | | 99°40'N | | | | 99°35'N | O-3-85 330 | | 99°30'N | | | | |

*FIG. 7*

VISUAL DATABASE FOR LINKING GEOGRAPHY TO SEISMIC DATA

CROSS-REFERENCES TO RELATED APPLICATIONS

This application is a divisional application of U.S. patent application Ser. No. 09/893,070 filed on 27 Jun. 2001 now abandoned.

FIELD OF THE INVENTION

The present invention pertains in general to geophysical seismic exploration and in particular to a method for linking a geophysical display to a geographic area and a medium containing seismic data files for producing the geophysical display.

BACKGROUND OF THE INVENTION

The process of collecting geophysical seismic data typically involves generating a seismic wave and measuring the response of the Earth's surface to the wave by using a plurality of receivers. The seismic wave may be generated by a source, such as a vibrator operating at a controlled frequency and amplitude, or may simply be the explosion of an amount of dynamite. At sea, air guns that eject compressed air may be used.

The reflected signals are collected by receivers and transmitted to a recording unit. Receivers, such as geophones or hydrophones, are typically positioned in a line or other geometric pattern throughout an area to be seismically mapped. The received data is used to measure the time of the seismic waves as they travel down through the Earth's surface and are reflected back by the various layers of materials forming the Earth's subsurface geology.

As the seismic wave (i.e., a shot) is initiated, the reflected signals are collected by each receiver for an amount of time to produce a set of geophysical seismic data. The geophysical seismic data is collected and stored on magnetic tape in industry standard formats. The recorded data is combined and processed. The resulting data represents subsurface geology and can be displayed. Rasterizing can be used to create an image file, which can then be plotted and studied by seismic experts. Study of geophysical seismic data can reveal important information, such as the location of oil, gas, and mineral deposits. Thus, the geophysical seismic data can be extremely valuable.

While there are many potential buyers of such geophysical seismic data, the large volume of seismic data that are available, coupled with the large size of each seismic data file, can make it difficult for a potential buyer to effectively sort through the available seismic data and select the desired files. To illustrate, a buyer wishing to review a seismic data file for potential purchase generally begins by making inquiries with a data broker. Request and release forms corresponding to the requested data files are prepared and sent to the appropriate parties for signatures. Once approval is obtained from the owner of the seismic data, the processed seismic data is either plotted to create hard copy prints of seismic sections, which are then sent to the broker's office, or hard copies are retrieved from a storage facility.

When the hard copy prints are received, the buyer is contacted and invited to view the images of the seismic sections. Since the hard copy prints contain important seismic data, care must be taken to protect the ownership interests of the owner of the seismic data. Thus, the buyer is usually permitted to view the hard copy prints only while in the broker's office. The buyer can then decide whether to purchase the full seismic data file and/or the hard copy prints. Depending on a number of factors, such as the speed of obtaining the appropriate approvals, and the speed of creating and shipping the hard copy prints, the entire process can take from two to four weeks to complete.

A further complication may arise if the buyer is uncertain as to the specific data that the buyer wishes to purchase. For example, while the buyer may be interested in a certain county or other geographic region, the buyer may only wish to purchase data for those specific areas that indicate a high likelihood of oil and gas deposits. In this circumstance, the buyer may request a number of hard copy prints for inspection, but may only purchase the data corresponding to the more pertinent prints.

Thus, there is a need to decrease the amount of time required to process a request for seismic data, such that a potential buyer can more quickly have access to the desired seismic data, while at the same time protecting the ownership interests of the owner of the seismic data and reducing the costs of providing the seismic data to a potential buyer.

SUMMARY OF THE INVENTION

One aspect of the invention is directed to an article of manufacture having a plurality of computer readable files relating to geophysical seismic data recorded thereon. The article comprises a medium having the computer readable files recorded thereon. The files include data for a map display for a geographical area. The map display has multiple levels of geographic detail and includes a plurality of surface seismic data lines. The files further include data for a plurality of compressed seismic data files corresponding respectively to the surface seismic data lines. Each of the compressed seismic data files is used to produce a corresponding geophysical display when its corresponding surface seismic data line is selected. The files also include a plurality of references to a plurality of full seismic data files. The references correspond respectively to the plurality of compressed seismic data files. Each of the compressed seismic data files has less information content than its corresponding full seismic data file.

Another aspect of the present invention is directed to a method for enabling a buyer to select a full seismic data file desired from among a plurality of full seismic data files. A computer system reads a map of a geographic area from a computer readable medium. The map is displayed to enable selection of a region within the geographic area. The selected region can then be displayed at a higher level of detail to enable selection of a sub-region within the selected region. The map includes a plurality of surface seismic data lines, each corresponding to a compressed seismic data file. Each of the compressed seismic data file is derived from and has less information content than its corresponding full seismic data file. Additionally, each of the compressed seismic data file contains a reference to its corresponding full seismic data file. A geophysical image corresponding to one of the compressed seismic data files is displayed by the computer system based on a selection of the corresponding surface seismic data line. The buyer can thus determine whether the full seismic data file corresponding displayed geophysical image is desirable for purchase.

BRIEF DESCRIPTION OF THE DRAWINGS

A more complete understanding of the present invention and its advantages will be readily apparent from the following Detailed Description taken in conjunction with the accompanying drawings. Throughout the accompanying drawings, like parts are designated by like reference numbers and in which:

FIG. 7 is a map of a geographic area at yet a higher level of detail in accordance with the present invention and in which at least one surface seismic data line is shown.

DETAILED DESCRIPTION OF THE PREFERRED EMBODIMENTS

Figure 1:
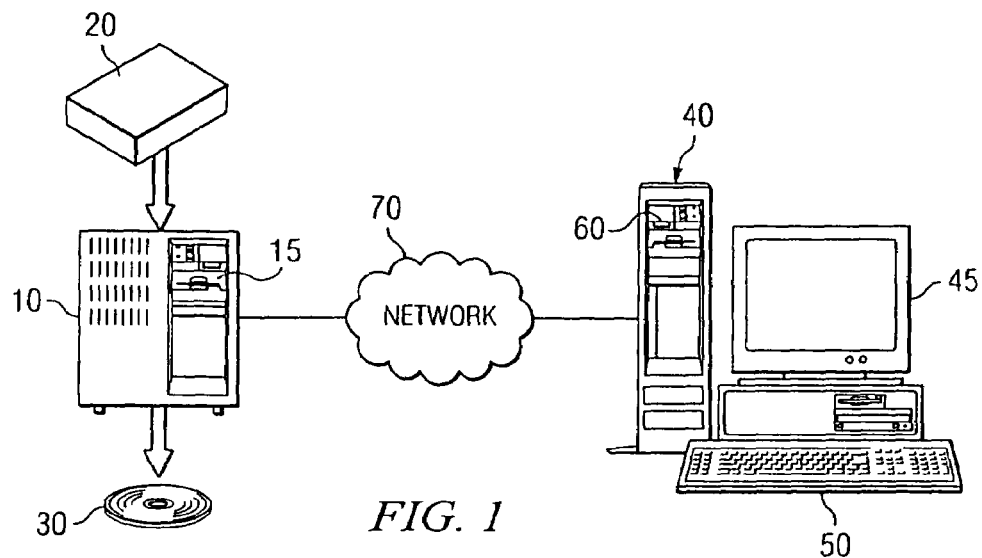
FIG. 1 is a schematic illustration of a computer network for processing data in accordance with the present invention.

FIG. 1 schematically illustrates a hardware environment for an embodiment of the present invention. A server computer 10 includes a reader 15 for interacting with a data storage device 20 containing a full seismic data file. The server computer 10 uses conversion and compression algorithms to create a compressed seismic data file. The server computer 10 links the compressed seismic data file to a map display for a geographic area, and provides a reference from the compressed seismic data file to the full seismic data file. The compressed seismic data file, the map display, and the reference can then be placed on a computer readable medium 30. For convenience, the computer readable medium 30 may be a removable media including but not limited to various optical formats (e.g., compact disk (CD), digital versatile disk (DVD), magneto-optical (MO) disk); magnetic formats (e.g., magnetic tape, magnetic disk, microdrive); or semiconductor formats (e.g., compact flash).

A broker computer 40 includes a monitor 45 (e.g., CRT, LCD display, etc.) and an input device 50 (e.g., a mouse and/or a keyboard) for interacting with the broker computer 40. The broker computer 40 also includes a device 60 for reading a computer readable medium 30 manufactured in accordance with the present invention.

Alternatively, the computer readable medium 30 may be a fixed medium within the broker computer 40, such as a hard disk drive, which is capable of receiving data files for storage therein. The data files may thus be transmitted to the broker computer 40 via a computer network 70 for storage in the fixed medium. The server computer 10 and the broker computer 40 may be personal computers, workstations, minicomputers, or mainframes.

The medium 30 contains a plurality of maps, having multiple levels of geographic detail. The maps include a plurality of surface seismic data lines that are visible and selectable when the map is viewed at a high level of detail.

The medium 30 also contains a plurality of compressed seismic data files corresponding respectively to the surface seismic data lines. The compressed seismic data files are preferably image files for producing a geophysical display of a seismic cross-section along the surface seismic data line selected. Each of the compressed seismic data files contains a reference to a full seismic data file. In one embodiment, the reference is embedded in the compressed seismic data file and is visible in the geophysical display.

In one embodiment, the files stored on the medium 30 may be stored in the form of Web pages. The broker computer 40 thus executes a Web browser, such as Microsoft Internet Explorer or Netscape Navigator, for displaying the Web pages. Since the Web format is familiar to most users, the difficulties associated with learning and using a proprietary interface can be avoided. Of course, other formats may be used without departing from the scope of the present invention.

An embodiment of the present invention is now described generally in reference to FIG. 1. A potential buyer (or licensee) of seismic data typically begins by making inquiries of a data broker. The data broker invites the buyer to the data broker's office, which contains a broker computer 40 and a computer readable medium 30 manufactured in accordance with the present invention.

The broker computer 40, operating in conjunction with the medium 30, presents the buyer with a map display. The map display contains multiple levels of detail, to allow the buyer to focus in on a particular geographic area of interest. As the map is displayed at higher levels of detail, surface seismic data lines become visible on the map display and can be selected.

Selection of a surface seismic data line causes the broker computer 40 to produce a geophysical display from a compressed seismic data file. The buyer can then evaluate the geophysical display to determine the desirability of obtaining a full seismic data file and/or a high quality image corresponding thereto. By using a reference identifier associated with the compressed seismic data file, the broker can place an order for the full seismic data file, which contains the raw seismic data and is typically available on magnetic tape. The buyer can also opt to purchase a high quality image corresponding to the geophysical display, which is produced by processing the raw seismic data and is typically available as a hard copy print.

Figure 2:
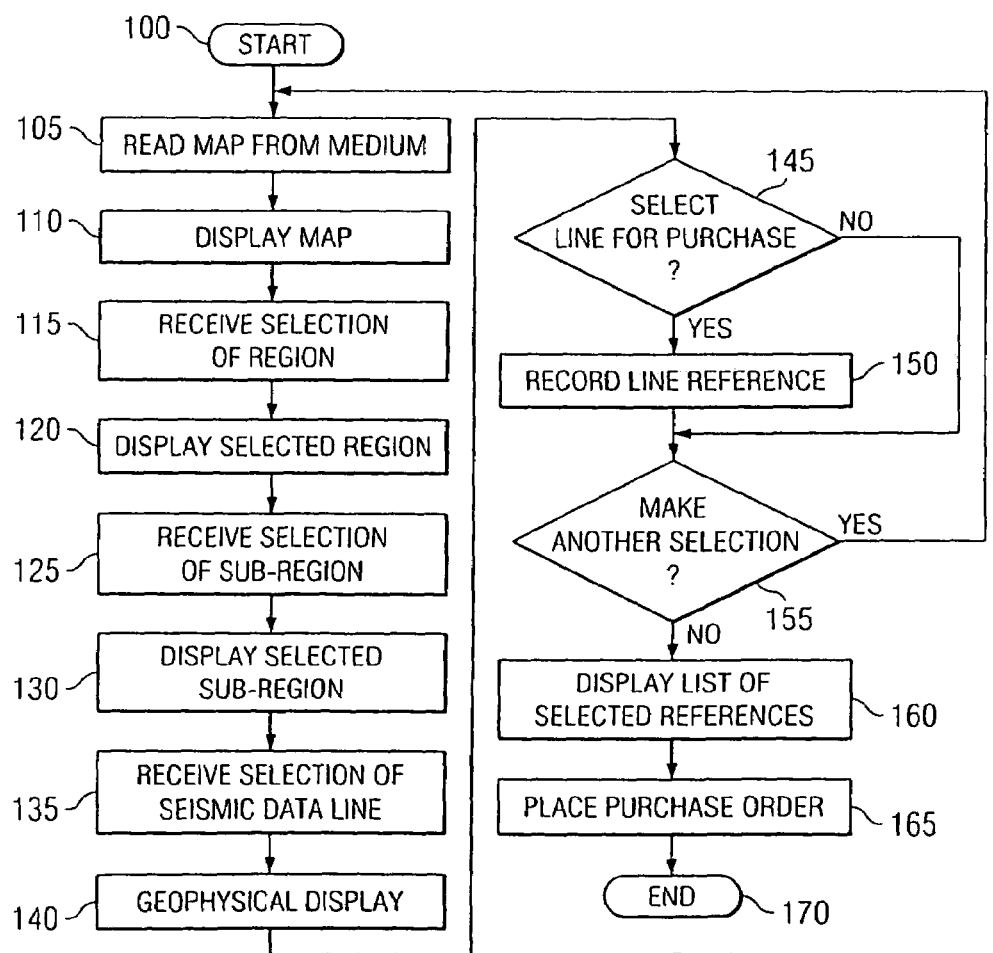
FIG. 2 is a flow diagram illustrating the operation of a broker computer in accordance with the present invention in which the broker computer interacts with a potential buyer to enable the buyer to select a desired seismic data file.
Figure 5:
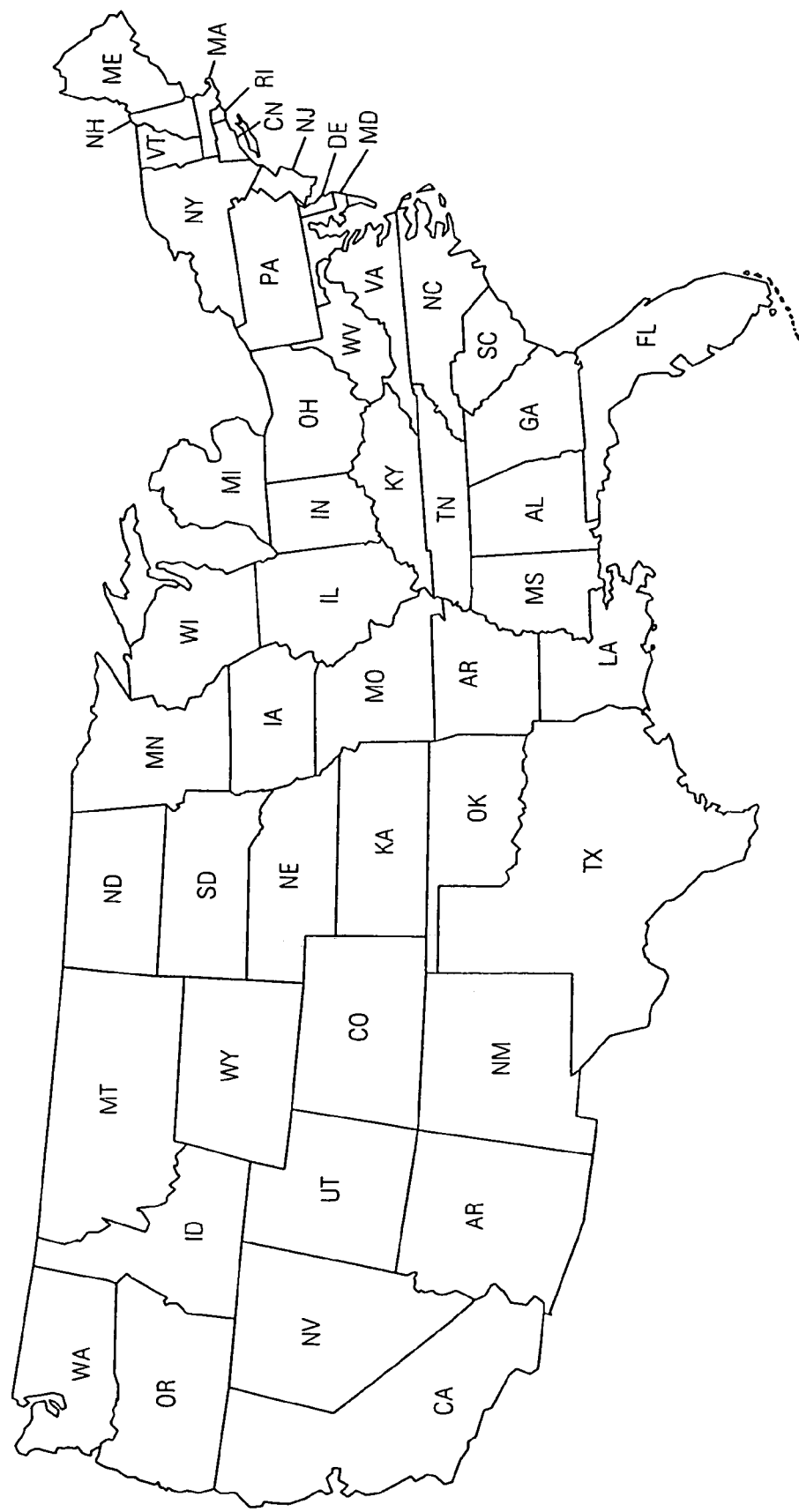
FIG. 5 is a map of a geographic area in accordance with the present invention.

FIG. 2 illustrates a flow diagram of the operation of the broker computer 40 for enabling the buyer to select and purchase a full seismic data file. The process starts at step 100. To initiate the process, in step 105, the broker computer 40 reads a data file for a map display from the medium 30. The broker computer 40 then displays the map in step 10. The initial map displayed is usually at a low level of geographic detail, and may be an image of a country, or other large geographic area, such as shown in FIG. 5.

Then, in step 115, the broker computer 40 receives from the operator, who may be a buyer or a data broker, the selection of a particular region within the initial map. The broker computer 40 then displays the selected region at a higher level of geographic detail in step 120. For example, selection of a particular state within a country causes the broker computer 40 to display an image of the selected state.

Then, in step 125, the broker computer 40 receives the selection of a sub-region within the region displayed. The broker computer 40 then displays the selected sub-region at a higher level of geographic detail in step 130. At this level of detail, surface seismic data lines are visible. Each surface seismic data line corresponds to a compressed seismic data file stored on the medium 30 and which represents the geologic structure underlying the seismic data line.

In step 135, the broker computer 40 receives the selection of a surface seismic data line. In step 140, the broker computer 40 retrieves the compressed seismic data file corresponding to the surface seismic data line selected. Then, in step 140, the broker computer 40 displays a geophysical image corresponding to the compressed seismic data file. In one embodiment, the compressed seismic data file is an image file that is stored on the medium 30 in a compressed graphic format, such as GIF (graphics interchange format) or JPEG (Joint Photographic Experts Group). The compressed seismic data file is derived from and contains less information content than the corresponding full seismic data file.

Once the buyer has studied the geophysical image, the buyer can decide whether to purchase the full seismic data file corresponding to the surface seismic data line displayed. In step 145, the broker computer 40 offers the buyer the option of purchasing the data. If the buyer agrees to purchase the data, the broker computer 40 then records the reference corresponding to the surface seismic data line displayed in step 150 and continues to step 155, where the selection of another surface seismic data line can be made. If, in step 145, the buyer decides not to purchase the data, the broker computer 40 continues directly to step 155.

In step 155, the broker computer 40 provides the buyer with the option of selecting another surface seismic data line and viewing a geophysical display corresponding thereto. If another selection is desired, the process then returns to step 105, wherein the initial map is read from the medium 30 for display in step 110. In another embodiment, the process can simply return to step 130 and display the sub-region that was previously selected to allow the buyer to select another surface seismic data line in step 135.

If, in step 155, no further selection is required, the process continues to step 160 wherein a list of references corresponding to the surface seismic data lines selected is displayed. The buyer can, at this point, confirm the selection of the corresponding full seismic data files for purchase. The full seismic data files typically contain raw, unprocessed data as recorded by the seismic receivers. The full seismic data files, therefore, require substantial processing before they can be properly reviewed by seismic experts. At this point, the buyer can also be presented with the option to purchase a high resolution image of each of the selected surface seismic data lines. The high resolution image is similar to the geophysical display produced from the compressed seismic data files, but is available at a much higher resolution. Since the high resolution image has already been processed to some extent, the image can be directly reviewed by the seismic experts.

Then, in step 165, the broker computer 40 can place a purchase order for the full seismic data files and/or the high resolution images corresponding to the surface seismic data line. The process then ends in step 170.

Figures 3, 4:
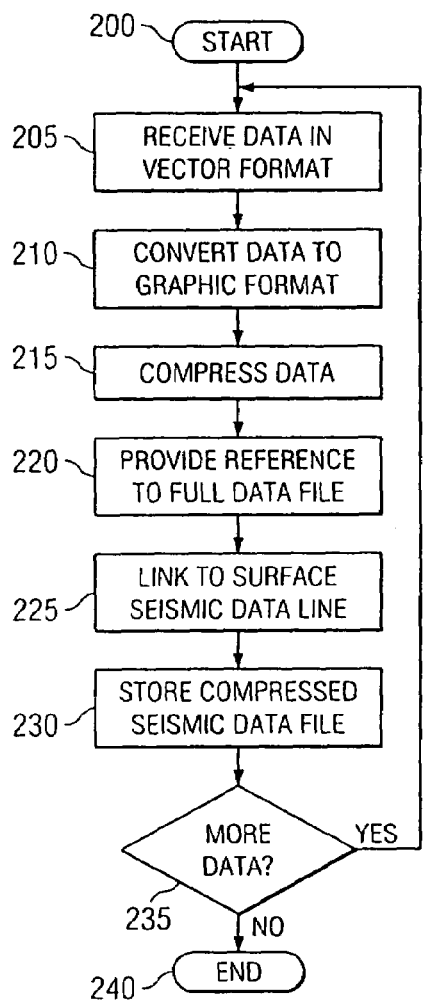
FIG. 3 is a flow diagram illustrating a method of manufacture of a computer readable medium in accordance with the present invention.
FIG. 4 is a partial listing of the contents of the medium in accordance with the present invention.

FIG. 3 illustrates a flow diagram for manufacturing a computer readable medium in accordance with the present invention. The process starts at step 200. In step 205, a computer system receives a full seismic data file for processing. The full seismic data file contains data stored in a vector format, as originally recorded by the various seismic receivers at the time of the shot. The data is then subjected to extensive processing to determine the three-dimensional geologic structure underlying the surface seismic data line.

Then, in step 210, once the data has been processed, a portion of the geologic structure (e.g., a two-dimensional image taken along the surface seismic data line) can be imaged and converted into a graphic format, such as a computer graphics metafile (CGM) format. In step 215, a compression program is used to compress and convert the data into another graphic format, such as the JPEG format. In one embodiment, another compression program is used to compress the JPEG data even further. A number of different compression programs may be employed as necessary. Alternatively, the same compression program may be repeatedly executed as necessary until the compressed seismic data file is within a predetermined file size. The compression program(s) are employed to produce a compressed seismic data file having a sufficiently small file size such that a large number of files may be placed on a single medium 30.

The use of lossy compression techniques and formats such as JPEG results in a compressed seismic data file having less information content than the original full seismic data file. Having less information content allows the size of the compressed seismic data file to be much smaller than the size of the full seismic data file. Less information content also allows the proprietary interests of the data owner to be protected. For example, while some useful knowledge may be gained from viewing the geophysical display formed from the compressed seismic data file, the amount of information available in the compressed seismic data file is still significantly less than would be available were the buyer to purchase the full seismic data file.

Then, in step 220, a reference to the full seismic data file is provided. The reference can simply be embedded within the compressed seismic data file, for example, a serial number that is visible when viewing an image of the compressed seismic data file. Alternatively, the reference can be electronically associated with the compressed seismic data file, such that a program can read the reference and determine the corresponding full seismic data file.

Then, in step 225, the compressed seismic data file is linked to a surface seismic data line. For example, a map having a surface seismic data line may be hyperlinked to the compressed seismic data file. Of course, other methods of linking the compressed seismic data file to the surface seismic data line are possible and are within the scope of the present invention. Selection of the corresponding surface seismic data line will thus result in a geophysical display from the compressed seismic data file.

In step 230, the compressed seismic data file and the reference are stored. Then, in step 235, the computer system determines whether there are more full seismic data files to be processed. If so, the process returns to step 205 wherein the next full seismic data file is received for processing. If there are no more full seismic data files, the process ends at step 240.

The compressed seismic data file and the reference can be stored in, for example, a hard disk drive, until all the data has been processed. Then, once all of the data corresponding to a particular geographic area has been processed, the maps (including the surface seismic data lines), the compressed seismic data files, and the references may be copied onto a computer readable medium for execution on a computer system.

FIG. 4 illustrates a partial listing of the contents of a computer readable medium in accordance with the present invention. In this embodiment, the files are formatted for use with a Web browser.

The file "Index.htm" is an introductory page, containing, for example, an identity of the data owner, along with an indication of the locations for which seismic data is available. Selection of a location invokes the file "USA-Map.htm" containing a map display file "usa-color.jpg." FIG. 5 illustrates a map of a geographic area that, in this embodiment, spans the contiguous United States.

Figure 6:
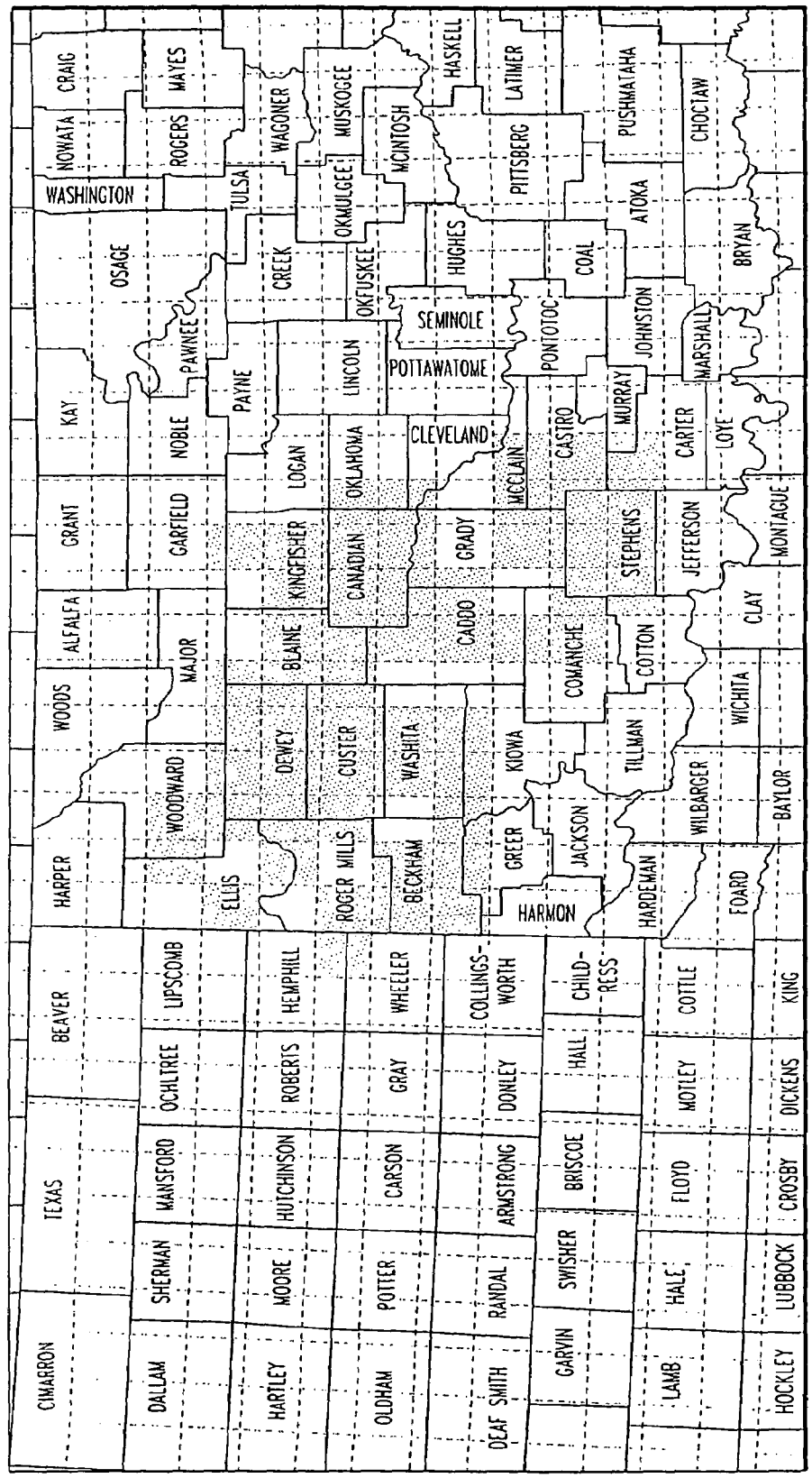
FIG. 6 is a map of a geographic area at a higher level of detail in accordance with the present invention.

Selection of a region on the map, the state of Oklahoma, for example, invokes the file "OK.htm" containing a map display file "Okquads_A.jpg." FIG. 6 illustrates a map of the state of Oklahoma. The area is depicted at a higher level of detail than the previous map of the United States and includes geographic designations such as county names. Also illustrated in the map of FIG. 6 are line markings for a plurality of sub-regions, also referred to as "quadrangles" or quads.

Selection of a particular quad, in this example, "Tangier," invokes the file "tangier.htm" containing a map display file "tangier.jpg." FIG. 7 illustrates a map of the Tangier quadrangle. This geographic area is again depicted at a higher level of detail than the previous geographic areas. Additionally, a plurality of surface seismic data lines are visible on this image of the Tangier quadrangle, line 0-92 300, line 0-90 310, line 0-4-85 320, line 0-3-85 330, and line 0-89 340.

Selection of a particular surface seismic data line, line 0-4-85 320, for example, invokes the file "240.jpg" which is a compressed seismic data file. In this embodiment, the compressed seismic data file "240.jpg" produces the geophysical display illustrated in FIG. 8. Selection of different surface seismic data line will result in the display of, for example, the file "239.jpg." Upon visual inspection of the geophysical display, the buyer can determine whether the full seismic data file corresponding to the compressed seismic data file is desirable for purchase.

Figure 8:
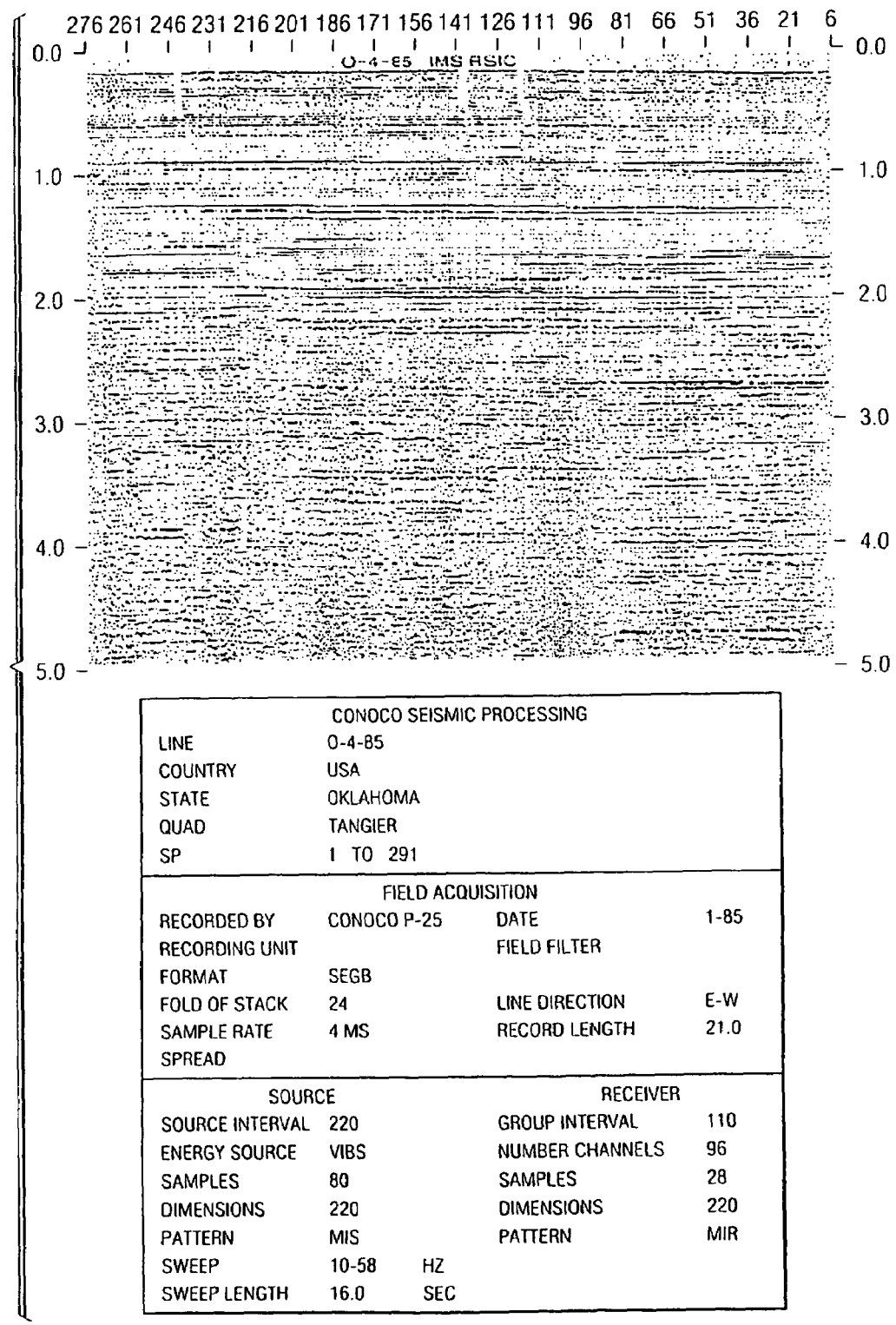
FIG. 8 is a geophysical display corresponding to one of the surface seismic data lines shown in FIG. 7.

In the embodiment illustrated in FIG. 8, the geophysical display produced by the compressed seismic data file "240.jpg" includes references embedded therein. For example, on the left side of the seismic cross-section is information relating to the geographic location of the surface seismic data line. The information includes the country (USA), state (OK), quad (Tangier), and the particular line (O-4-85) within the quad. In this instance, the reference indication of the line includes the letter O, which again confirms that this surface seismic data line is located in the state of Oklahoma. Alternatively, the reference can be stored in an HTML or, preferably, an XML file that contains a link to the geophysical display. Placing the reference to the full seismic data file within an XML file allows another program to extract the information and, preferably, fill out a purchase order for the buyer based on the surface seismic data lines selected.

Although the present invention has been fully described by way of examples and with reference to the accompanying drawings, it is to be understood that various changes and modifications will be apparent to those skilled in the art without departing from the spirit and scope of the invention. Therefore, unless such changes and modifications depart from the scope of the present invention, they should be construed as being included therein.

What is claimed is:

1. A method, using a computer system, for enabling a buyer to select a desired full seismic data file from among a plurality of available full seismic data files, the method comprising the steps of:

reading a map of a geographic area from a computer-readable medium;

displaying said map of said geographic area to enable selection of a region therewithin for display at a higher level of detail, said map including a plurality of surface seismic data lines, each of said surface seismic data lines corresponding respectively to one of a plurality of compressed seismic data files; and displaying a geophysical image corresponding to one of said compressed seismic data files based on a selection of a corresponding one of said surface seismic data lines so as to allow said buyer to determine a desirability of said full seismic data file corresponding to said compressed seismic data file forming said geophysical image thus displayed, each of said compressed seismic data files being derived from and having less information content than the corresponding one of said corresponding full seismic data files, each of said compressed seismic data files containing a reference to a respective one of said full seismic data files.

2. A method in accordance with claim 1, further comprising the step of providing to said buyer an option to purchase said full seismic data file corresponding to said geophysical image displayed.

3. A method in accordance with claim 1, further comprising the step of recording said reference if said buyer purchases said full seismic data file.

4. A method in accordance with claim 3, further comprising the step of displaying a list of selected references to allow said buyer to confirm the selection of said corresponding full seismic data files for purchase.

5. A method in accordance with claim 1, wherein said medium is a removable medium selected from the group consisting of:

a compact disk (CD);

a digital versatile disk (DVD);

a magneto-optical (MO) disk;

a magnetic tape;

a magnetic disk;

a microdrive; and a compact flash card.

6. A method in accordance with claim 1, wherein said medium is fixed within said computer system, said map and said compressed seismic data files being received from another computer for storage on said medium.

* * * * *